May 22, 1951 P. S. MARTIN 2,554,370
TEMPERATURE CONTROL DEVICE
Filed June 11, 1946 3 Sheets-Sheet 1
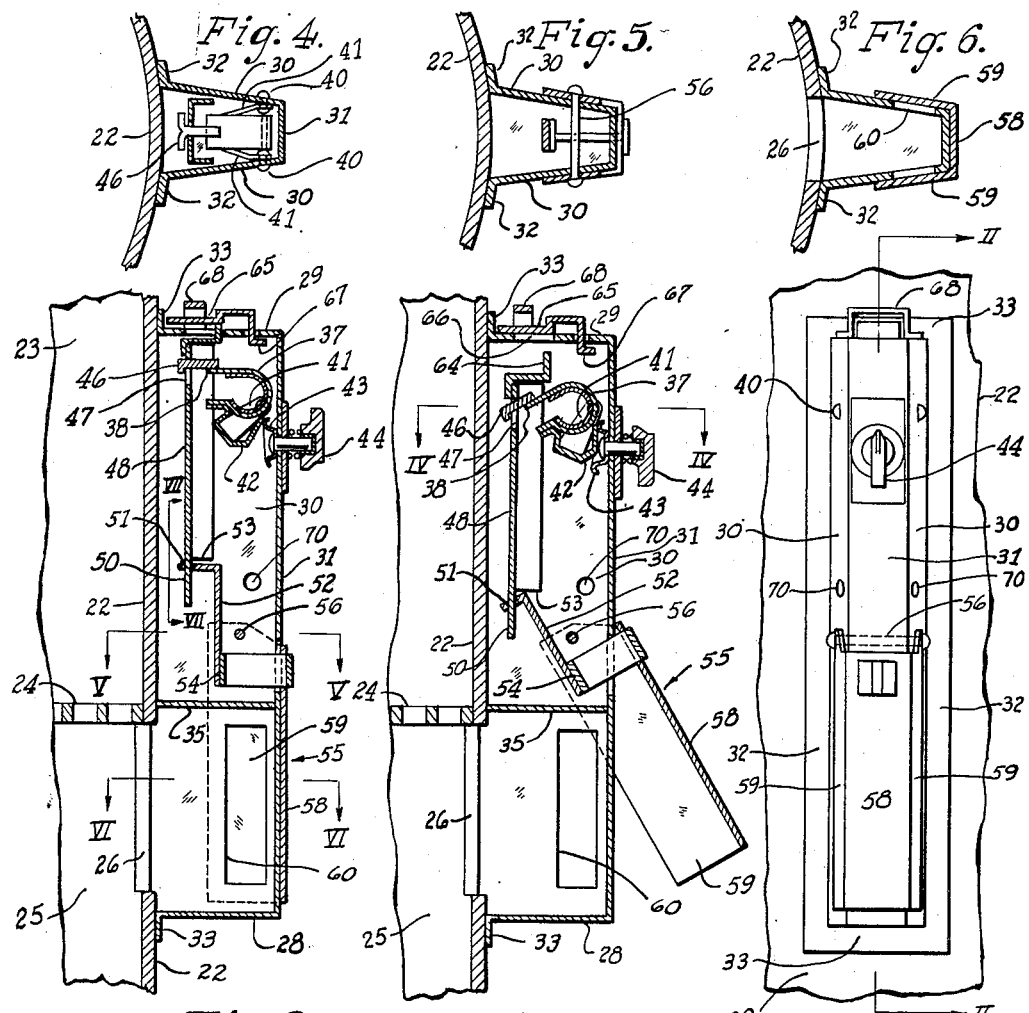
Perry S. Martin
INVENTOR
BY Louis Necho
ATTORNEY

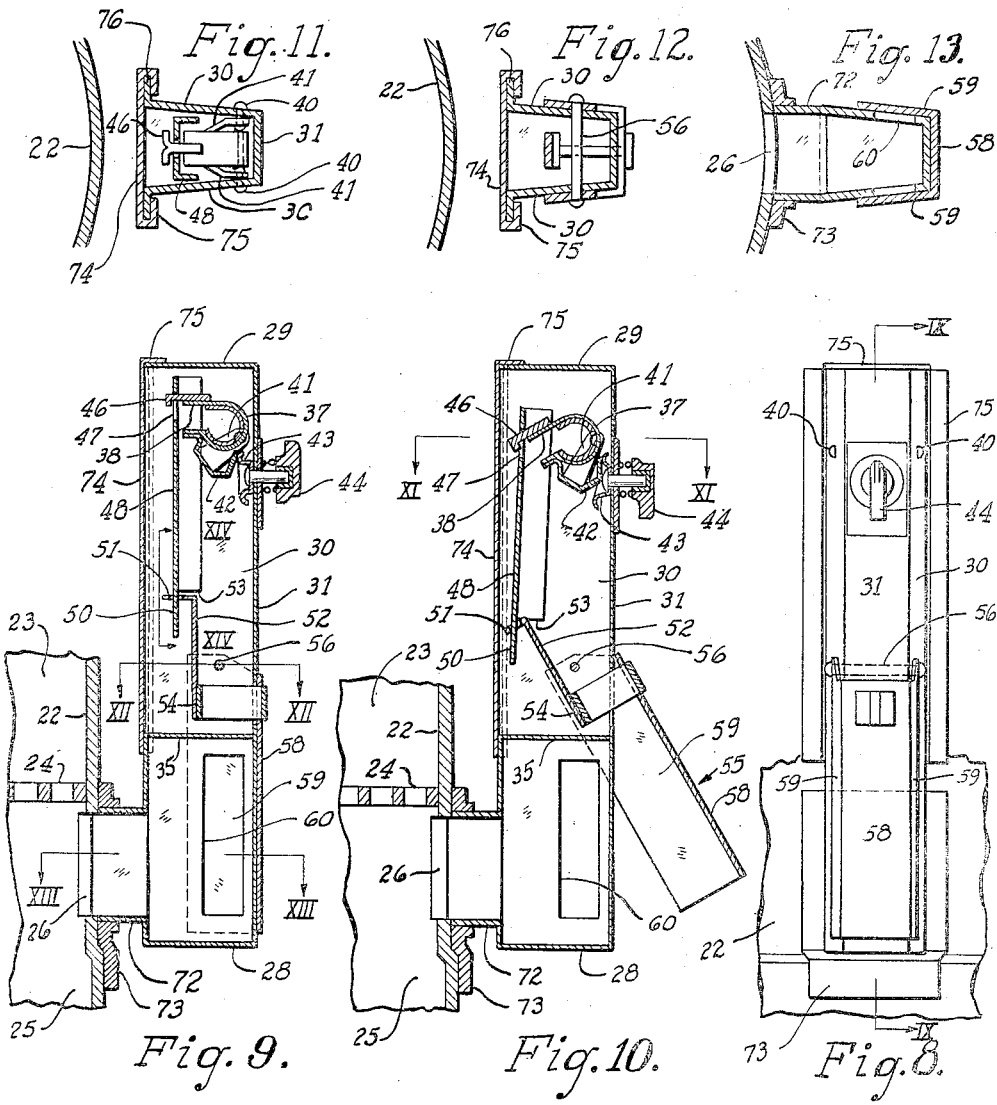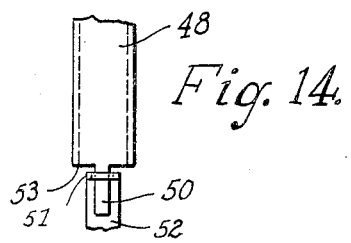

May 22, 1951 — P. S. MARTIN — 2,554,370
TEMPERATURE CONTROL DEVICE
Filed June 11, 1946 — 3 Sheets-Sheet 3
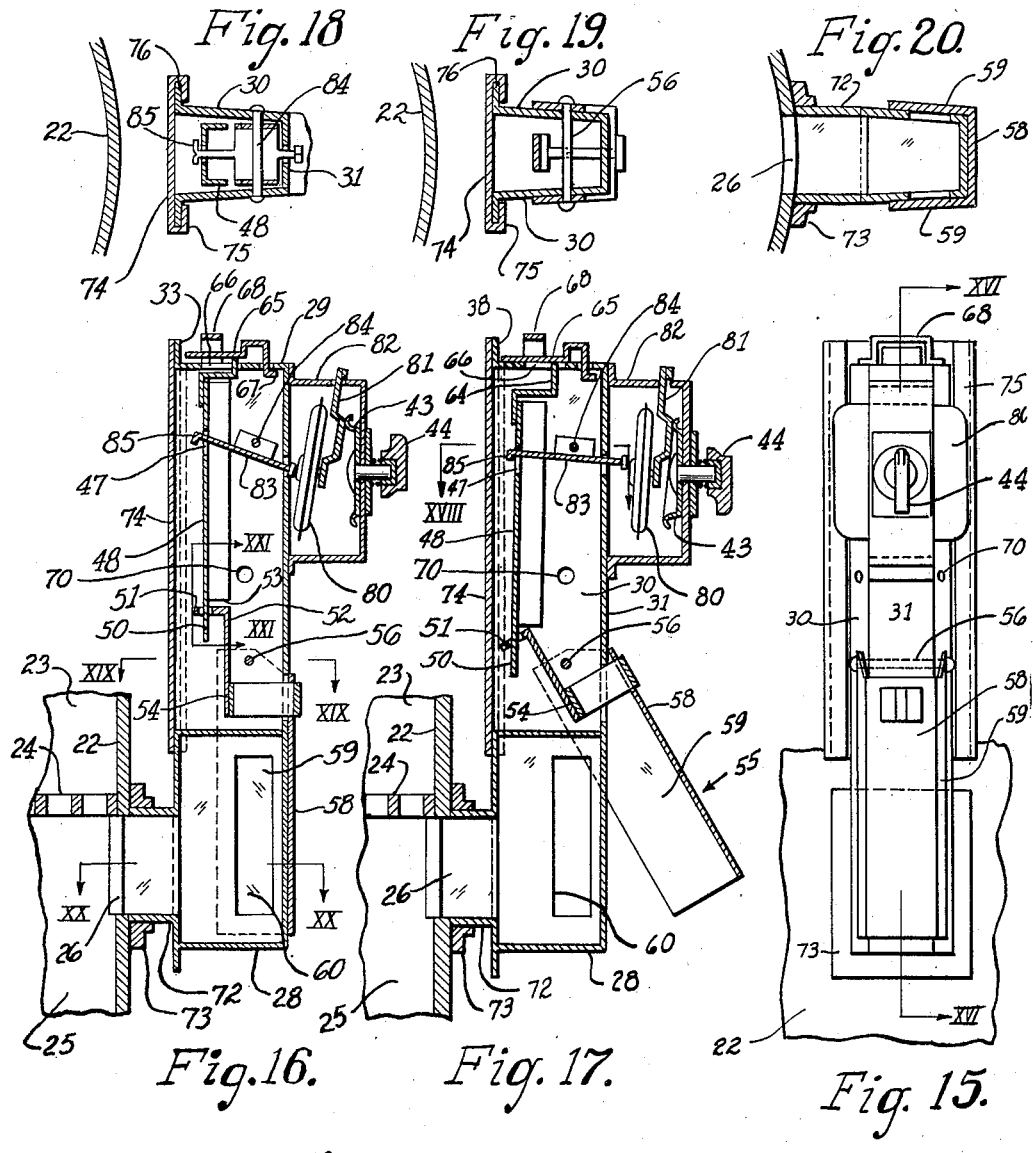
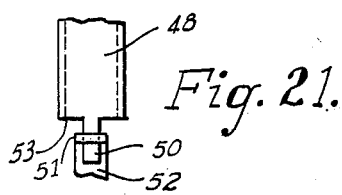
Perry S. Martin
INVENTOR
BY Louis Necho
ATTORNEY Patented May 22, 1951

2,554,370

UNITED STATES PATENT OFFICE 2,554,370

TEMPERATURE CONTROL DEVICE

Perry S. Martin, Harrisonburg, Va.

Application June 11, 1946, Serial No. 676,007

1 Claim. (Cl. 236—96)

My invention relates to a temperature-regulating device of the type which includes a heat-responsive element arranged to actuate a damper for varying the amount of air admitted to the combustion chamber of a heating apparatus, such as a stove or the like.

One object of the invention is to produce an improved temperature-regulating device.

A temperature-regulating device of this type is usually applied to, or is more or less closely associated with, the stove so that the heat-responsive element which actuates a damper controlling the combustion air inlet is more or less directly influenced by the heat of the stove. Since the ambient temperature of the space or room to be heated is not, exclusively, a function of the temperature of the stove, it follows that, in order to have a reasonably satisfactory control of the temperature of the room, the action of the heat-responsive element should be modified by the temperature of the room to be heated.

It is, therefore, a further object of the invention to produce an improved temperature-regulating device, the heat-responsive element of which is influenced by the temperature of the stove as well as by the ambient temperature of the room, so as to eliminate or satisfactorily reduce an over-ride in the temperature of the room which will otherwise occur.

It has heretofore been the usual practice to mount the damper controlling the combustion air inlet so as to be movable, in closing or opening direction, in the direction of the flow of air through said inlet. A damper so mounted will be subjected to air pressure over its entire surface area and, since the damper is pivoted for movement with minimum friction, it follows that the damper tends to move, under the air pressure, independently of the movement called for by the heating element. For example, a damper hinged for rotation about a horizontal axis, at a point above the air inlet, will be urged to closing position by the air flowing through the inlet at a time when the heat-responsive element is trying to move or retain the damper to or in an open position. Similarly, when the damper is fully closed, the reduced pressure prevailing in the combustion chamber or in the flue makes opening of the damper by the heat-responsive element more difficult. This undesired movement, or tendency to move, of the damper must be resisted by the heat-responsive element, or must be otherwise compensated for, if the position of the damper is to be a true function of the changes taking place in the heat-responsive member.

In order to overcome this difficulty, it has been heretofore proposed to pivot a flap damper at its exact center so that air pressure is equalized on both sides of the pivot. In this type of construction, one-half of the damper contacts the outside of the opening and the other half contacts the inside of the opening, and, therefore, either the damper or the wall surrounding the opening must be offset. This increases the difficulty in accurately die-forming the damper so that it will close snugly without considerable skill and effort. In many cases, hand fitting will be required.

Furthermore, a flap damper mounted as described makes an impact noise when it changes position, and such noise can be disturbing, especially during the night. It is, therefore, a still further object of the invention to produce an improved, simplified damper, which can be so arranged and mounted as to be not at all affected by the flow of air through the combustion air inlet controlled by the damper, or which can also be so arranged and mounted as to be responsive to the flow of air through the inlet to a predetermined extent.

It is a still further object of the invention to produce an improved damper construction and to mount such damper in such a manner that it will close snugly to insure substantially complete cut-off of the air, without the necessity of fabricating the coacting parts to very close tolerances.

A still further object is to produce an improved damper construction and an improved mounting therefor whereby the damper operation is substantially noiseless.

A still further object is to produce a light, inexpensive and durable temperature-regulating device.

These and other objects are attained by my invention as set forth in the following specification and the accompanying drawings, in which:

Fig. 1 is a front elevational view of a temperature-regulating device embodying my invention and shown applied to a stove.

Fig. 2 is a section on line 2—2 of Fig. 1.

Fig. 3 is similar to Fig. 2, but showing the air inlet open and showing the thermostat in a different setting from that shown in Fig. 2.

Figs. 4, 5 and 6 are fragmentary sectional views on lines 4—4; 5—5; and 6—6, respectively.

Fig. 7 is a fragmentary view looking in the direction of line 7—7 of Fig. 3.

Figs. 8 to 14, inclusive, are similar to Figs. 1 to 7, respectively, but showing another embodiment of the invention.

Figs. 15 to 21, inclusive, are also similar to Figs. 1 to 7, respectively, but showing still another embodiment of the invention.

In all of the three embodiments shown, 22 designates a portion of the exterior shell or body of a heating stove to which the temperature-regulating device is applied. The stove may be of the magazine-feed type which includes an upper space 23 for receiving coal or other solid fuel to be burned, a grate 24 and an ash pit 25 below the grate. The coal is consumed in the portion of the space 23 immediately above the grate and primary air is supplied through an air inlet opening 26 formed in a wall of the ash pit. These parts, being common to all three modifications, are similarly numbered in all of the drawings.

Figs. 1 to 7

In this embodiment, the regulating device includes an elongated casing formed of a bottom wall 28, a top wall 29, outwardly-converging side walls 30 and one front or outer end wall 31. The inner or rear end of the casing is closed by the wall 22 of the stove on which the casing is mounted by means of flanges 32 formed at the margins of the side walls 30 and flanges 33 formed at the inner margins of the top and bottom walls 28 and 29 of the casing. The casing is also provided with a horizontal partition 35 which divides the interior of the casing into upper and lower non-communicating compartments.

In the upper compartment is mounted a heat-responsive member, such as a bimetal thermostat 37, which is generally curved substantially as shown. The thermostat is so arranged that, as the temperature falls, the upper free arm 38 of the thermostat moves downwardly toward the position shown in Fig. 2 and so that, as the temperature rises, the free arm 38 moves upwardly towards the position shown in Fig. 3. The thermostat is mounted for pivotal movement on a horizontal pin 40 passing through and carried by the side walls of the casing. As shown, the thermostat is provided with side wings 41 engaging the pin 40 and has a bottom extension 42 engaging an adjusting cam 43 adapted to be turned by a knob 44. The thermostat may, if desired, be carried by a suitable bracket engaging the cam, the only requirement being that, when the high portion of the cam contacts the thermostat or its support, the thermostat pivots in clockwise direction to raise the free arm 38 thereof, as in Fig. 3, and when the low portion of the cam contacts the thermostat or its support, the thermostat pivots in counterclockwise direction to lower the free arm 38, as in Fig. 2.

The free end of the arm 38 engages, or has a finger 46 thereon which engages, a slot 47 formed in the upper end of a freely movable channel 48. The channel 48 is thus movable vertically with the movement of the free arm 38 of the thermostat.

The lower end of the channel 48 is reduced to form a finger 50 which engages a slot in a flange 51 formed at the upper end of lever 52, and a shoulder 53 for engaging the flange 51. The lever 52 is connected at 54 to the upper end of a damper 55, which is pivoted at 56 to the side walls of the upper compartment of the casing. The damper is formed of an outer or front wall 58 and outwardly-converging side walls 59 and is adapted to overlap or enclose the lower portion of the casing, as shown in Figs. 3 and 6. As will be best seen from Fig. 6, the casing and the damper taper outwardly so that the side walls of the damper may snugly engage the side walls of the casing without binding and with little or no impact noise.

The lower compartment of the casing is provided with one or more openings 60 through which air is admitted into the lower compartment of the casing and to the ash pit 25 through the opening 26. When the damper is in the positions shown in Figs. 3 and 6, the openings 60 are fully obstructed by the walls 59 of the damper, and when the damper is in the position shown in Fig. 2, the openings 60 are entirely unobstructed. Intermediate positions of the damper will obstruct the openings 60 accordingly.

At this point, attention is directed to the fact that, due to the arrangement of the damper, its movement is not materially affected by the flow of air through or towards the openings 60. By this arrangement, there is never any great amount of positive or negative air pressure on the end wall 58 of the damper as would be the case if the air inlet opening were located in a plane parallel to the plane of the wall 58. In my construction, the side walls 59 move at a right angle with reference to the direction of the flow of air through the openings 60, so that the obstructing walls 59 cut across the stream of air instead of bucking it. This is an important feature and, being common to all three embodiments, will not be again described in connection with the other embodiments.

The channel 48 is so related to the damper and is of such weight that if it is left unsupported so as to be free to move downwardly, the bottom shoulder 53 thereof will bear down on the flange 51 of the lever 52 and will move the damper to the position of Fig. 2. The damper and the lever 52, on the other hand, are so arranged that, when the channel 48 is raised to disengage the shoulder 53 from the flange 51, the damper will move, by gravity, to the position shown in Fig. 3. This feature, too, is common to all of the embodiments and will also not be again described in connection with the other embodiments.

The operation of the thermostat is as follows: Disregarding the adjusting cam for the moment, as the temperature rises, the free arm 38 straightens out and moves upwardly, thus lifting the channel 48 and permitting the damper to gravitate toward the closing position of Fig. 3. Conversely, as the temperature falls, the free arm 38 tends to curl and thus permits the channel 48 to fall to move the damper toward the open position shown in Fig. 2. This operation of the thermostat is identical to that of the thermostat shown in Figs. 9 and 10 and will, therefore, not be again explained.

The regulating device also includes a lug 64 carried by, or formed on, the upper end of the channel 48 and movable therewith. The lug 64 is adapted, when the channel 48 is raised to the position shown in Fig. 3, to contact and raise a pivoted damper 65, which, when the channel 48 is lowered, obstructs an opening 66 formed in the top wall 29 of the regulator casing. The damper 65 is pivoted by having its flanged end 67 movable in an opening formed in the top wall 29 of the casing, and its upward movement is limited by a stop 68.

The upper opening 66 and the damper 65 coact with one or more lower openings 70, formed in the lower portion of the casing, to produce or prevent circulation of room air through the casing and past the thermostat, so as to modify the action of the thermostat according to the ambient temperature of the room in the following manner:

When the ambient temperature of the room is below the desired value, and the wall of the stove is relatively cool, the thermostat, disregarding the adjusting cam 43, will be in the position shown in Fig. 2, in which the damper is fully open to allow full flow of air through the openings 60. As the fire increases, the temperature of the stove wall 22 increases and, since the regulator casing is in heat-conducting relation to the stove wall and since the thermostat is subjected to direct radiant heat, it will, in the absence of the damper 65 and openings 66 and 70, relatively quickly move to the position shown in Fig. 3, in which the openings 60 are wholly closed. This banks the fire and reduces the generation of heat, even though the temperature of the room to be heated is below the desired value. But, according to my invention and by provision of the damper 65 and openings 66 and 70, this cannot happen. Thus, as soon as the damper 65 is raised, room air beings to flow rather rapidly through the lower openings 70, upwardly through the casing past the thermostat, and out through the opening 66. If the temperature of the room air is below the desired value, it will cool the thermostat, thus causing it again to move the damper toward its non-obstructing position of Fig. 2. This condition will persist until the room air reaches the value to which the thermostat is adjusted by the cam 43, when the parts will remain in the position shown in Fig. 3, or in some intermediate position of equilibrium.

After the fire has been banked for some time, and the ambient temperature has fallen to a predetermined value, the regulator casing, in general, will cool off somewhat, and such room air as enters through the lower openings 70 will cause the thermostat to move in damper-opening direction. By setting the thermostat and calibrating it, it will have an anticipating action which will insure that the temperature of the room does not fall too low before the generation of heat is resumed.

Independently of its calibration or its inherent characteristics, the thermostat is set or adjusted by the cam 43 so as to actuate the damper at predetermined temperature values. For example, if the bottom extension 42 is in contact with the high point of the cam, the arm 38 of the thermostat is raised to a position in which the damper is closed, regardless of the prevailing temperature. If the low portion of the cam, or some intermediate portion thereof, is in contact with the bottom extension of the cam, the distance the arm 38 has to move in response to increased temperature will be varied accordingly, and so will the temperature value at which the damper will move toward the open position of Fig. 2.

It will thus be seen that, by the novel arrangement of the damper, its movement and position will at all times be a true function of the condition of the thermostat and that, by the provision of the damper 65, the opening 66 and the opening or openings 70, any temperature override that may otherwise occur is eliminated, or at least satisfactorily reduced, and a reasonably satisfactory control of the temperature of the room to be heated is obtained.

In a magazine-type heating stove, a relatively large amount of coal is introduced through a top door (not shown) into the cylindrical space defined by the shell 22. If the stove is assumed to have just about burnt out, the grates are shaken to remove the ashes, and the remaining glowing cinders now rest on, or immediately above, the grate. When fresh coal is introduced, the zone of combustion will, at first, be in the lower portion of the stove or in the vicinity of the grate. As the bottom layer of coal burns out, the zone of combustion gradually moves upwardly. In other words, the zone of maximum heat perambulates between the grate and the top of the stove.

Also, in this type of stove, the magazine is usually lined with refractory brick so that the heat emanating from the zone of combustion is transmitted to the exterior of the shell 22 rather slowly.

In some types of construction, such as, for example, that which is illustrated in my prior Patent No. 2,399,814, entitled "Solid Fuel Heating Stove," a space is provided between the brick lining and the shell 22, which space communicates with the interior of the magazine and with the stack. The reduced pressure in this space causes inflammable gases, which are distilled from the green coal above the zone of combustion, to flow into this space where such gases are consumed. The combustion of gases in the space between the bricks and the shell greatly increases the heat output and raises the temperature of the corresponding portion of the shell.

Obviously, any heat-responsive member intended to control the flow of combustion air into the solid fuel combustion chamber, or into the gas combustion chamber, or both, will not operate satisfactorily if it is only affected by the heat of any one portion of the stove. For instance, if the heat-responsive device is so positioned as to be affected only by heat conducted from, or radiated by, the top of the stove, the heat-responsive device, barring the effect of the ambient temperature, will be "cold" and will keep the damper open as long as the fire is in the immediate vicinity of the grate, and, of course, the same thing will happen if the heat-responsive device is affected only by the heat of the bottom portion of the stove when the bottom layers of coal are burnt out and the zone of combustion is near the top of the stove. By the time a heat-responsive device, arranged as described, is sufficiently affected by the heat of the stove or the ambient temperature to open or close the damper, the stove has become too hot or too "cold," so that there will be a substantial, positive or negative, temperature over-ride.

By reference to Figs. 1 to 7, it will be seen that the elongated casing above the partition 35 abuts a corresponding portion of the stove shell 22, so that, by conduction through the flanges 32 and 33, and radiation and convection, the bimetal member 37 will at all times be substantially uniformly subjected to the temperature of the stove, regardless of whether the combustion zone is near the grate, at the middle, or near the top of the stove. In the drawings, the stove body is only fragmentarily illustrated, but in actual practice, the length of the casing above the partition 35 is substantially equal to the length of the portion of the stove above the grate 24.

It will, therefore, be seen that the embodiment of Figs. 1 to 7 is a particularly advantageous one for use on magazine-type heating stoves, since the heat-responsive member is at all times subjected to the maximum temperature of the stove. This prevents, or at least minimizes, positive or negative temperature over-ride.

Figs. 8 to 14

This embodiment is applicable to magazine or other types of heating stove and differs from the embodiment of Figs. 1 to 7 in that the casing is mounted on the outer end of a connecting pipe section 72 which is secured to a flanged collar 73 surrounding the air inlet 26. The regulator casing is provided with a back wall which has a detachable sliding connection with side walls of the casing so as to afford ready access to the interior of the casing. As shown, the marginal portions 75 of the back wall 74 are deflected to form channels for slidably engaging flanges 76 formed at the marginal portions of side walls of the casing.

In this construction, the back wall 74 of the casing is out of physical contact with the body of the stove, but it is located in close proximity thereto, so that it is subjected to some extent to the radiant heat of the stove, and to that extent it will be responsive to the temperature of the stove regardless of the perambulation of the combustion zone. However, because the thermostat casing is surrounded by room air on all sides, the openings 66 and 70 and the auxiliary damper 65 may be dispensed with. Furthermore, in this embodiment, the circulation of room air around the casing modifies the action of the thermostat, thus again preventing, or at least minimizing, temperature over-ride. In this embodiment, the thermostat acts in response to the temperature of the air of the room as well as the temperature of the stove itself.

Except as pointed out, the structure and operation of the embodiment of Figs. 8 to 14 are identical with those of the embodiment of Figs. 1 to 7 and, therefore, the parts common to both embodiments have been designated by the same reference numerals.

Figs. 15 to 21

It will be noted that, in the embodiments of Figs. 1 to 14, the heat-responsive member is a bimetal element, and since the movement of a bimetal element per degree of temperature is relatively small, the bimetal member is subjected to direct heat of the stove, as in Figs. 1 to 7, or to a somewhat indirect heat, as in Figs. 8 to 14. This insures sufficient movement of the bimetal element to actuate the damper.

In the embodiment of Figs. 15 to 21, in which a wafer-type thermostat 80 is used, it is not necessary to subject the thermostat to high temperature differentials because the movement of a wafer-type thermostat per degree of temperature is relatively great, so that a relatively small change in temperature will move the thermostat sufficiently to actuate the damper. In other words, a wafer-type thermostat can operate satisfactorily in response to relatively small changes in ambient temperature.

Therefore, in this embodiment, the wafer thermostat 80 is enclosed in a separate compartment carried by the upper portion of an elongated casing, similar to the casing shown in Figs. 9 and 10, and housing the damper-actuating mechanism. As shown, the wafer thermostat is carried by a bracket 81 pivoted to the top wall 82 of the thermostat compartment so as to be movable toward and away from outer end wall 31 of the regulator casing. The wafer thermostat is adapted to be adjusted by a cam 43 which engages the outer wall of the bracket 81 and which, in structure and operation, is identical with the cam previously described. The inner wall of the wafer thermostat is adapted to engage and actuate a lever 83, pivoted at 84. The inner end 85 of the lever 83 engages and actuates the damper-operating channel 48 in the manner above described. It will be noted that the lever 83 passes from the thermostat compartment through an opening in the outer casing wall 31, thus minimizing the transmission of heated air from the elongated casing housing the damper-operating means to the wafer thermostat compartment.

When the thermostat 80 expands on a rise in temperature, its inner wall tilts the lever 83, as shown in Fig. 17, thus raising the channel 48 and moving the damper to closing position. The same action takes place when the bracket 81 of the wafer thermostat is engaged by the high portion of the cam, also as shown in Fig. 17.

It will be understood that the cam is adjusted as shown in Figs. 2, 9 and 16 when it is desired to maintain a low temperature in the room or when the temperature of the room is only slightly below the desired value.

From the foregoing it will be seen that, since the wafer thermostat is housed in a casing which is separated from the stove body by the casing of Figs. 1 to 14, the thermostat is subjected to very little, if any, conductive or radiant heat, so that it can be said to be responsive substantially exclusively to the temperature of the ambient air.

If desired, the upper opening 66, the upper damper 65 and the air inlet openings 70 may be incorporated in this embodiment, thus further shielding the wafer thermostat from the direct heat of the stove.

Since, except as pointed out, the embodiment of Figs. 15 to 21 is otherwise the same as the embodiments previously described, the parts common to this embodiment and the embodiments of Figs. 1 to 14 have been numbered with the same reference numerals.

In all embodiments, the side walls 30 of the casing and the side walls 59 are shown as very slightly converging. This means that the damper responds very little to the variation of the barometric pressure in the combustion chamber. This response is so small that, for practical purposes, it can be ignored and the damper can be said to be responsive to the action of the thermostat exclusively. If desired, the side walls of the casing and the side walls of the damper can be made to converge more sharply, in which event the response of the damper to the variations of air pressure in the combustion chamber will be increased accordingly.

What is claimed is:

A temperature control device including an elongated casing, a partition dividing said casing into mutually separated upper and lower compartments, means securing said casing to a stove with a vertical side thereof adjacent a vertical wall of said stove, there being a first opening leading from said lower compartment into the combustion air inlet of said stove, a heat-responsive element in said upper compartment, there being a second opening leading from the space to be heated into said lower compartment, said second opening being so related to said first opening that the axis of movement of a stream of air flowing from said space into said lower compartment intersects the axis of movement of the air flowing from said lower compartment into said combustion air inlet, a damper adapted to close said second opening, means pivotally mounting said damper for movement in a vertical plane which intersects the axis of movement of air flowing through said second opening, whereby said damper is movable to a first position in which it does not obstruct said second opening, to a second opening in which it wholly obstructs said second opening, and to intermediate positions for partially obstructing said second opening, means operatively connected to said damper and said heat-responsive element to move said damper in response to the movement of said heat-responsive element to open or close said second opening, there being an opening near the top of said upper compartment, and an auxiliary damper normally closing said opening, said damper being adapted to be opened by said elongated member when said heat-responsive element moves in response to a rise in temperature, there being another opening in a wall of said upper compartment at a point below said auxiliary damper.

PERRY S. MARTIN.

REFERENCES CITED

The following references are of record in the file of this patent:

UNITED STATES PATENTS

| Number | Name | Date |
| --- | --- | --- |
| 11,386 | Race | July 25, 1854 |
| 1,208,432 | Wiley | Dec. 12, 1916 |
| 1,886,368 | Blancke | Nov. 8, 1932 |
| 2,359,962 | Barnes | Oct. 10, 1944 |
| 2,388,829 | Cheasley | Nov. 13, 1945 |

FOREIGN PATENTS

| Number | Country | Date |
| --- | --- | --- |
| 49,568 | Sweden | Aug. 22, 1917 |